United States Patent [19]

Wyle et al.

[11] Patent Number: 4,512,947
[45] Date of Patent: Apr. 23, 1985

[54] METHOD AND APPARATUS FOR APPLYING SOLVENT TO TUBING, OTHER CYLINDRICAL OBJECTS OR OTHER FLEXIBLE MATERIAL

[75] Inventors: Charles Wyle, Los Angeles; Donald M. Shea, Torrance, both of Calif.

[73] Assignee: Charles Wyle Engineering Corporation, Torrance, Calif.

[21] Appl. No.: 491,740

[22] Filed: May 5, 1983

[51] Int. Cl.³ .............................................. B29C 27/00
[52] U.S. Cl. ...................................... 264/343; 156/83; 156/305; 264/248; 264/249
[58] Field of Search ............... 264/343, 341, 558, 516, 264/248, 249; 156/83, 305

[56] References Cited

U.S. PATENT DOCUMENTS

| | | | |
|---|---|---|---|
| 1,625,907 | 4/1927 | Peterson | 156/305 |
| 2,199,228 | 4/1940 | Obenshain et al. | 91/50 |
| 2,257,355 | 9/1941 | Vohrer | 264/249 |
| 2,396,946 | 3/1946 | Grupe | 427/374.4 |
| 2,565,316 | 8/1951 | Lucas et al. | 264/343 |
| 2,617,456 | 11/1952 | Winkel | 144/279 |
| 3,304,353 | 2/1967 | Harautuneian | 264/516 |
| 3,356,062 | 12/1967 | Crowe | 118/7 |
| 3,607,180 | 9/1971 | Merz et al. | 65/33 |
| 3,608,005 | 9/1971 | Fortner | 264/343 |
| 3,697,313 | 10/1972 | Stumphauzer et al. | 118/318 |
| 4,052,249 | 10/1977 | Bruce et al. | 156/513 |
| 4,186,225 | 1/1980 | Smith et al. | 427/233 |
| 4,210,478 | 7/1980 | Shoney | 264/248 |

FOREIGN PATENT DOCUMENTS

| | | | |
|---|---|---|---|
| 2536100 | 2/1977 | Fed. Rep. of Germany | 425/445 |
| 1262780 | 2/1972 | United Kingdom | 264/249 |

Primary Examiner—Jeffery Thurlow
Attorney, Agent, or Firm—Thomas I. Rozsa

[57] ABSTRACT

The present invention relates to an improved method and apparatus for applying solvent to an object for the purpose of solvent bonding the object to another object. The present invention is especially useful in connection with narrow diameter hollow cylindrical objects such as tubing. The present invention is especially applicable to high speed and mass production requirements where numerous pieces must be solvent bonded in rapid succession.

40 Claims, 7 Drawing Figures

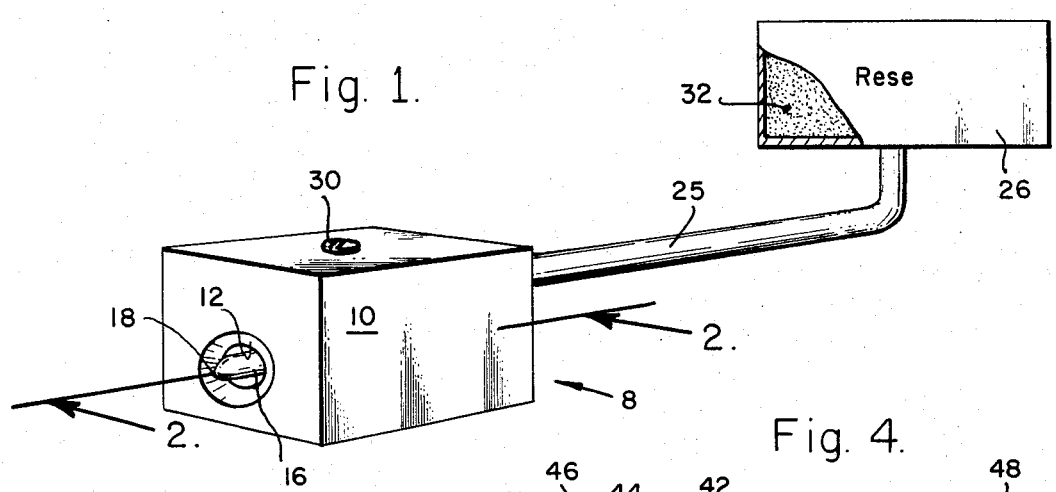
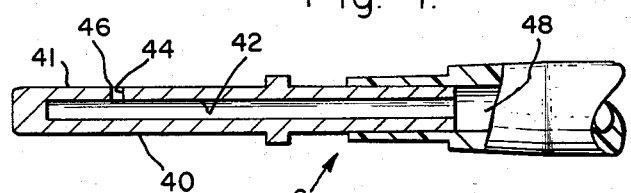
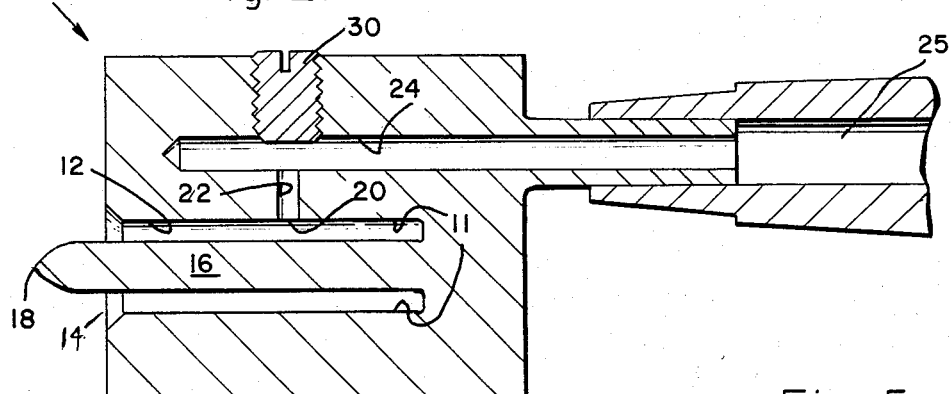
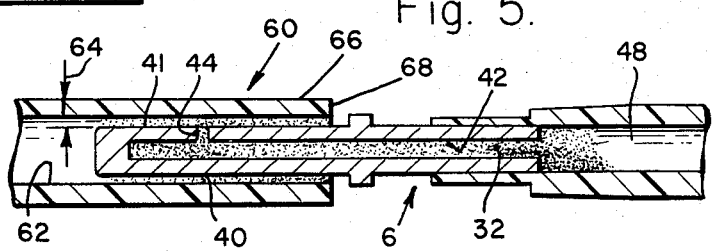
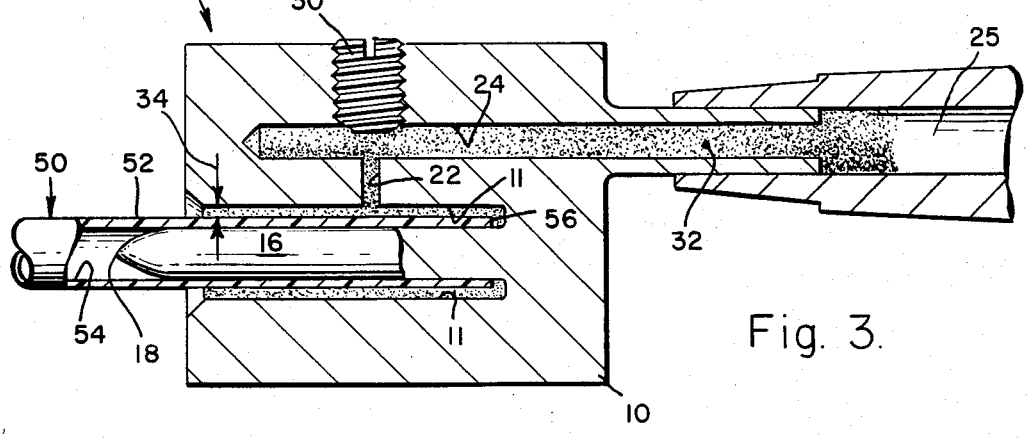

METHOD AND APPARATUS FOR APPLYING SOLVENT TO TUBING, OTHER CYLINDRICAL OBJECTS OR OTHER FLEXIBLE MATERIAL

BACKGROUND OF THE INVENTION

1. Field of the Invention

The present invention relates to an improved method and apparatus for applying solvent to tubing, other cylindrical objects or other flexible material. The present invention is especially applicable to high speed and mass production requirements where numerous pieces must be solvent bonded in rapid succession. Solvent bonding is the process of coating one piece of material with a chemical and then bringing the coated piece into contact with a second piece of material for the purpose of adhering the two together. The chemical serves to dissolve and melt a portion of the two adjoining surfaces such that the two surfaces are bonded together.

2. Description of the Prior Art

In almost all prior art embodiments, automatic solvent bonding is accomplished by applying the solvent or bonding chemical by means of an applicator such as a wick. The applicator is dipped into the solvent solution and then rubbed onto the surface of one of the two objects which are to be solvent bonded. In the case of tubing or other objects which are generally cylindrical in shape and have a hollow interior, the applicator is rubbed along the external surface at the location where the bond is desired. In the case of applying solvent to the internal portion of the hollow cylindrical object, an applicator somewhat in the shape of a pipe cleaner is inserted into the object and then rubbed around the interior surface at the location where the bond is to be formed.

In almost all prior art applications which involve manual solvent bonding, one of the pieces to be solvent bonded is manually dipped into a bath of solvent and then brought into contact with the other part to which it will be solvent bonded. This process is commonly known as dipping and dabbing. In another manual application which is known in the prior art, a syringe is filled with solvent and the surface to be solvent bonded is coated with solvent by squirting the solvent through a hypodermic needle located at one end of the syringe.

While the method and apparatus used in prior art applications is satisfactory for individual hand application or low speed automatic application of solvent for the purposes of solvent bonding where the applicator can be frequently cleaned, this method and apparatus is totally unsatisfactory in high speed mass production operations for several reasons. First, in a high speed mass production solvent bonding operation, the applicator is required to be coated with solvent and then apply the solvent to the desired surface very quickly and frequently. Due to the frequent dipping and the adhesive nature of the solvent, the applicator which is frequently in the form of a wick or pipe cleaner type structure becomes coated with dissolved material and must be cleaned or replaced. This is due to the fact that the solvent dissolves the material to which it is applied and then when this partially dissolved material is brought into contact with the second material, the partially dissolved material refuses or resolidifies thereby bonding the two components together. Since the applicator wick contacts this partially dissolved material, small amount of the partially dissolved material adheres to the wick. Therefore, the wick must be frequently cleaned or replaced. The cleaning and/or replacement of the applicator result in frequent machine down time. Second, the use of these applicators frequently results in an uneven coating of the surfaces since the quantity of solvent which adheres to the applicator after successive dippings cannot always be accurately controlled. The problem is especially severe when coating the internal surface of a narrow diameter tube or comparable object. Since the wick must be inserted into the tube, then possibly rotated and then removed, uneven coating frequently occurs. In addition, it is virtually impossible to prevent solvent from being placed on the edge of the interior surface. Therefore, in applications where it is desired not to have solvent on the edge of the interior surface, this result is almost impossible to achieve with the prior art embodiments.

Several different types of bonding and coating techniques are illustrated in the following issued patents:

1. U.S. Pat. No. 3,607,180 issued to Mars for Bonding With A Glass Frit Coating Applied By A Knurled Roller.
2. U.S. Pat. No. 4,052,249 issued to Bruce for a Face Sealing Valve Applicator.
3. U.S. Pat. No. 3,356,062 issued to Crowe for a Gravimetric Coating Control System.
4. U.S. Pat. No. 2,617,456 issued to Winkel for a Lumber Gluing Machine.
5. U.S. Pat. No. 2,396,946 issued to Grupe for a Method and Apparatus For Applying Thermoplastic Material To A Sheet Or Web.
6. U.S. Pat. No. 2,199,228 issued to Obenshain et al for a Method Of And Apparatus For Coating Paper.
7. U.S. Pat. No. 4,186,225 issued on a Method Of Coating The Interior Surfaces Of A Hollow Article.
8. U.S. Pat. No. 3,697,313 issued to Stumphauzer et al on a Method Of Spraying Closed End Cans.

None of the above referenced patents disclose any apparatus or method for efficiently applying solvent on a rapid and mass production basis to an object. None are even remotely useful for applying solvent on a rapid and mass production basis to narrow diameter hollow cylindrical objects.

SUMMARY OF THE PRESENT INVENTION

The present invention relates to an improved method and apparatus for applying solvent to an object for the purpose of solvent bonding the object to another object. The present invention is especially useful in connection with narrow diameter hollow cylindrical objects such as tubing. The present invention is especially applicable to high speed and mass production requirements where numerous pieces must be solvent bonded in rapid succession.

The present invention comprises two separate pieces of apparatus which can be combined into one unit if desired or utilized separately. The first apparatus is employed to apply solvent to the exterior surface of a cylindrical object such as a tube. For applying solvent to the object's exterior surface, the object is inserted into a chamber of similar cross-sectional configuration and which contains one or more transverse holes or openings. For example, if the object is a tube, then the chamber is cylindrical and therefore circular in cross-section. The hole or holes can be spaced at the desired distance from the leading edge of the chamber. Solvent is fed under pressure from an external reservoir to the chamber so that the solvent is squirted through the hole or holes in the chamber and onto the external surface of the object. The clearance between the external wall of the object and the internal wall of the chamber is sufficiently small so that capillary action will permit the solvent to be spread evenly around the circumference of the object at the desired location adjacent the hole(s). An aptional internal support bar can be utilized to assure that the inserted object will be centered within the chamber. Through this apparatus and associated method, small quantities of solvent can be very efficiently applied to the external surface of the object without all of the problems associated with automatic wick type applicators and manual devices in present use.

For applying solvent to the interior surface of an object, an internal shaft or housing whose cross-section is similar to and slightly smaller than the object is inserted into the object. For example, if the object is a tube, a housing which is cylindrical and has a cross-sectional diameter slightly smaller than the cross-sectional diameter of the tube is used. The housing contains either one or a multiplicity of holes on its circumference at the desired distance inward from the leading end. Solvent is fed into the housing under pressure from an external reservoir. A small quantity of solvent is squirted through the hole(s) and into the interior portion of the tubing or similar object wall. The gap between the exterior surface of the housing and the interior surface of the coated object is sufficiently small to permit capillary action to cause the squirted solvent to be spread over the entire interior object wall adjacent the location of the hole or holes in the shaft. Through this apparatus and associated method, small quantities of solvent can be very efficiently applied to the interior surface of an object without all of the problems associated with automatic wick type applicators and manual devices in present use.

For each of the above two methods, after the solvent is applied, the object is removed from the chamber or the housing is removed from the object, as the case may be, and the second object is brought into contact with and onto or into the coated object. The bonded objects are then moved to the next station. Through this method and apparatus, numerous objects can be solvent bonded in rapid succession which makes this invention ideal for mass production applications.

It is therefore an object of the present invention to provide a method and apparatus for coating the external surface of an object such as a tube with solvent in a rapid and efficient manner which permits numerous objects to be so coated in rapid succession. The present invention also permits the solvent applicator to apply the solvent on numerous applications over a long period of time without incurring expensive down time to clean the applicator or replace parts in the applicator.

It is another object of the present invention to provide a method and apparatus for coating the internal surface of an object such as a narrow diameter tube with solvent in a rapid and efficient manner which permits numerous objects to be so coated in rapid succession. The present invention also permits the solvent applicator to apply the solvent on numerous applications over a long period of time without incurring expensive down time to clean the applicator or replace parts in the applicator.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation there is illustrated:

FIG. 1 is a perspective view of one embodiment of the present invention, illustrating a solvent applicator which is used to coat the external surface of an object with solvent.

FIG. 2 is a cross-sectional view of the solvent applicator which is used to coat the external surface of an object with solvent, taken along line 2—2 of FIG. 1.

FIG. 3 is a cross-sectional view of the embodiment of the solvent applicator which is illustrated in FIG. 2 with an object inserted in the solvent applicator and being coated with solvent on its external surface.

FIG. 4 is a cross-sectional view of a second embodiment of the present invention, illustrating a solvent applicator which is used to coat the internal surface of an object with solvent.

FIG. 5 is a cross-sectional view of the second embodiment of the present invention as illustrated in FIG. 4 with the solvent applicator being inserted into an object and coating the internal surface of the object with solvent.

Figure 7:
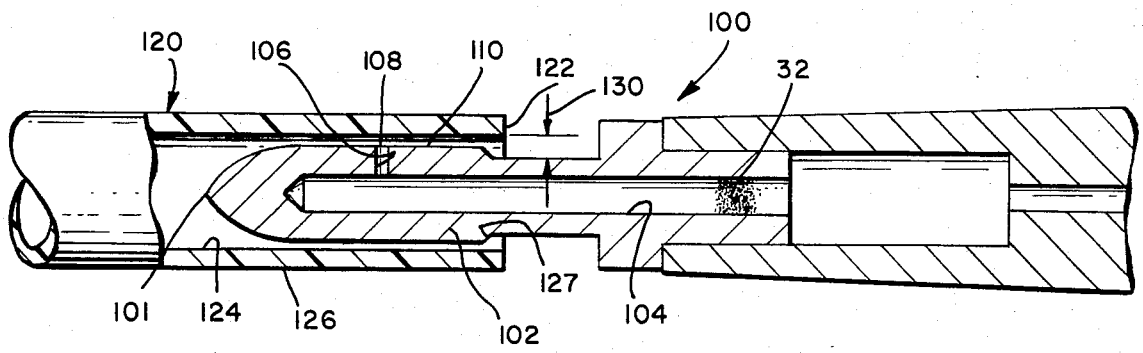

FIG. 7. is a cross-sectional view of an alternative embodiment of a solvent applicator which is used to coat the internal surface of an object with solvent.

DETAILED DESCRIPTION OF THE PREFERRED EMBODIMENT

The present invention comprises two separate pieces of apparatus which can be combined into one unit if desired or utilized as separate units. The method and apparatus of the present invention relates to applying a solvent such as Cyclohexanone to the external or internal surface of an object such as a hollow tube which is to be solvent bonded to another similar object. The concept of the present invention is to apply the solvent under pressure through a tiny discharge hole to the surface to be coated with solvent. Ideally there will only be one discharge hole in the applicator for each embodiment although a multiplicity of discharge holes are within the spirit and scope of the present invention. A further concept of the present invention is to have the distance between the surface being coated with solvent and the surface from which the solvent spray is applied located at a close distance from one another such that capillary action will cause the jet of solvent to be spread along the entire portion of the surface adjacent the location of the hole from which the solvent is emitted.

Referring to the drawings of the invention in detail, the first embodiment of the present invention which is used to apply solvent to the external surface of the object is shown in FIGS. 1 and 2. For purposes of the illustration, it will be assumed that the object to which solvent will be applied is a hollow cylindrical tube which can for example be made of plastic. The present invention 8 includes a housing member 10 which contains within it a hollow chamber 12. Since we are assuming that the object to which solvent will be applied is a cylindrical tube, the chamber 12 which will receive it is also cylindrical. It will be appreciated that if the cross-section of the object is other than circular, the cross-section of the chamber 12 will have a shape similar to that of the object, and will not be round as illustrated in FIGS. 1 and 2. The chamber is open at one end 14. The hollow chamber 12 contains within it a guide rod 16 which is positioned at the cross-sectional center of the chamber 12 and extends for the entire length of the chamber and slightly beyond its opening 14.

In the preferred embodiment, the guide rod 16 is pointed or spherical at its leading end 18. In the preferred embodiment, the chamber 12 contains a hole 20 at one point in its interior surface 11. The hole 20 leads into a transverse passage 22 in the housing member 10. The other end of the transverse passage 22 opens into a reservoir feed chamber 24. The reservoir feed chamber 24 extends out of the housing member 10 and to a reservoir supply tube 25 which in turn is connected to a reservoir 26 situated at a location remote from the housing member. It is within the spirit and scope of the present invention to have the reservoir 26 adjacent or even integral with the housing member 10. The reservoir feed chamber 24 is also provided with an optional opening 28 which is in alignment with the transverse passage 22 leading to hole 20. In ordinary use, the opening 28 is sealed by a plug or screw 30. The plug or screw 30 can be removed during maintenance operations to clean the reservoir feed chamber 24, the transverse passage 22 or the hole 20.

In operation, the present invention 8 works as follows. The object to be coated with solvent 50 is brought into alignment with chamber 12 and is then inserted into the chamber 12. Guiding rod 16 is inserted into the object 50 as it approaches the chamber 12 to thereby assure that the object 50 which as illustrated in FIG. 3 is a hollow cylindrical tube will be centered within chamber 12. A solvent 32 which is contained within reservoir 26 is then fed under pressure by means of a pump or comparable apparatus (not shown), through supply tube 25 and into reservoir feed chamber 24. The solvent 32 which by way of example can be Cyclohexanone then is forced through transverse passage 22 to hole 20 where it exits the wall of chamber 12 and hits the outer surface 52 of object 50. The gap 34 between the outer surface 52 of object 50 and the internal surface 11 of chamber 12 is sufficiently small such that capillary action causes the solvent to spread around most of the entire surface 52 of the object 50 which is contained within chamber 12. By way of example, the width of gap 34 can be approximately 5/1000ths to 10/1000ths of an inch in order to permit this capillary action to be effective. Another important feature of the present invention is that the duration of the pulse which causes the solvent to squirt into the chamber 15 is extremely short, for example only approximately 50 milliseconds. As a result, only a minute quantity of solvent 32 is injected into chamber 12 and onto the surface 52 of object 50. As a result, the process is extremely rapid and this facilitates the use of the present invention in mass production operations where solvent must be applied to many objects in rapid succession.

After the solvent 32 has been applied, the object 50 is removed from the chamber 12 and is inserted into a second object not shown. The solvent 32 has served to melt a portion of the surface 52 of object 50 and the object 50 is thereby solvent bonded to the second object (not shown) at the location of the exterior surface 52 where solvent 32 was applied.

In the preferred embodiment, only one hole 20 and transverse passage 22 is required because the capillary action will permit the solvent to rapidly spread to the entire surface to be coated. It is within the spirit and scope of the present invention to have a multiplicity of such holes 20 and transverse passages 22 either in alignment along the surface 11 and around the circumference of the chamber 12 at the same longitudinal location or else at spaced intervals along the length of chamber 12. Since the quantity of solvent used is minute due to the short length of injection time which can be approximately 50 milliseconds, the passage 22 and hole 20 will not become occluded and the interior of the object will also not become occluded. In addition, through use of the present invention, the amount of solvent being applied can be very accurately controlled. The amount of solvent being applied can also be easily varied by controlling the pulse length of the pump or injector which forces the solvent from the reservoir. Therefore, there is little likelihood of problems which result in costly downtime during the operation. As previously mentioned, the transverse passage 22 and hole 20 can be easily cleaned by removing plug or screw 30 and inserting a cleaner such as a pipe cleaner or cleaning wire.

Referring once again to the drawings of the invention in detail, the second embodiment of the present invention which is used to apply solvent to the internal surface of the object is shown in FIG. 4. Once again, for purposes of the illustrations, it will be assumed that the object to which solvent will be applied is a hollow cylindrical tube which can for example be made of plastic. The present invention 6, includes a housing 40 which can for example be in the shape of a cylinder. The housing contains within it a reservoir feed chamber 42. The reservoir feed chamber 42 extends for most of the length of the housing member 40 and opens into a reservoir supply tube 48 which in turn leads to a supply reservoir (not shown).

The reservoir can be the same as that used for the first embodiment. The reservoir feed chamber 42 opens into a transverse passage 44 which in turn ends in a hole 46 in the outer surface 41 of housing 40.

The operation of the second embodiment of the present invention is shown in FIG. 5. The housing member 40 is brought into alignment with the object 60 whose internal surface will have solvent 32 applied to it. The housing member 40 is then inserted into the hollow object 60 and penetrates the object a sufficient distance such that the hole 46 is in alignment with the area of the internal surface 62 of object 60 where solvent 32 is to be applied. Once again, there is only a very narrow gap 64 between the internal surface 62 of object 60 and the external surface 41 of housing member 40. Once again, by way of example the gap 64 can be approximately 5/1000ths to 10/1000ths of an inch. The purpose of the narrow gap is once again to facilitate capillary action. A solvent 32 which is contained within a reservoir such as reservoir 26 shown in FIG. 1 is then fed under pressure by means of a pump injector or comparable apparatus (not shown), through supply tube 48 and into reservoir feed chamber 42. The solvent 32 which by way of example can be Cyclohexanone then is forced through transverse passage 44 to hole 46 where it exits the surface 41 of housing member 40. The gap 64 between the outer surface 41 of housing member 40 and the inner surface 62 of object 60 is sufficiently small such that capillary action causes the solvent 32 to spread around the entire surface 62 of the object 60 which is adjacent the hole 46. Once again the duration of the pulse which causes the solvent 32 to squirt onto the inner wall 62 of object 60 is extremely short, for example only approximately 50 milliseconds. As a result, only a minute quantity of solvent 32 is injected from the housing member 40 onto the inner surface 62 of the object. Therefore, the process is extremely rapid and this facilitates the use of the present invention in mass production operations where solvent must be applied to many objects in rapid succession.

After the solvent 32 has been applied, the housing member 40 is removed from the object 60 and the object 60 then has a second object (not shown) inserted into it. The solvent 32 has served to melt a portion of the inner surface 62 of object 60 and the object 60 is thereby solvent bonded to the second object (not shown) at the location of the interior surface 62 where solvent 32 was applied.

In the preferred embodiment, only one hole 46 and transverse passage 44 is required because the capillary action will permit solvent 32 to rapidly spread to the entire interior surface area to be coated. It is within the spirit and scope of the present invention to have a multiplicity of such holes 46 and transverse passages 44 either in alignment along the surface 41 and around the circumference of housing member 40 at the same longitudinal location, or else at spaced intervals along the length of housing member 40. Since the quantity of solvent used is minute due to the short length of injection time which can be approximately 50 milliseconds, the transverse passage 44 and hole 46, and the interior of object 60 will not become occluded. In addition, through use of the present invention, the amount of solvent 32 being applied can be very accurately controlled. The amount of solvent 32 being applied can also be easily varied by controlling the pulse length of the injector or pump which supplies the solvent 32 from the reservoir 26. Therefore, there is little likelihood of problems which result in costly downtime during the operation. The reservoir feed chamber 42, transverse passage 44 and hole 46 can be easily cleaned by unplugging the reservoir feed chamber 42 from the reservoir feed tube 48, and inserting a cleaner such as a pipecleaner or cleaning wire.

In the embodiments described above, the gap between the wall of the object being coated with solvent and the surface of the present invention from which the solvent was being applied was equidistant along the entire length of the object from its open end to a distance well beyond the location were solvent was emitted from the solvent applicator. It has been discovered that in certain applications, the uniform gap width permits the capillary action to spread the solvent over the entire area adjacent the transverse solvent application passage, and this extends to the open end of the object being coated with solvent. As a result, in the embodiment disclosed in FIGS. 1, 2 and 3, solvent 32 spreads all the way to the leading or open end 56 of object 50 and as a result some solvent may go around the open end 56 and enter the interior surface 54 of object 50. This is a highly undesirable result since solvent is not wanted on the interior surface 54 of object 50. This leads to a dissolving of the object in an area where it is not wanted and further leads to solvent coming in contact with guide rod 16 which is also highly undesirable. Similarly, in the embodiment disclosed in FIGS. 4 and 5, the uniform gap 64 permits capillary action to occur along the entire distance between the exterior surface 41 of the applicator 40 and the interior surface 62 of the object 60 where they are parallel. As a result, solvent 32 reaches the leading edge 68 of object 60 and can flow around the leading edge 68 onto the exterior surface 66 of object 60. Once again, this is highly undesirable since the solvent will now dissolve a portion of the object where we do not want solvent bonding to occur.

Therefore, in order to avoid the above mentioned problem in both of the embodiments of the present invention, it is necessary to break the capillary action at a location adjacent the leading or open end of the object being coated with solvent in order to assure that no solvent will reach the leading end and have the opportunity to flow around the leading end and onto the other surface of the object where we do not want solvent to go. It has been discovered that if the width of the gap is increased at the location adjacent the leading edge of the object, then the capillary action will be broken and will cease adjacent the open or leading end of the object and therefore no solvent will flow as far as the leading end. This in turn eliminates the potential problem of having the solvent flow around the leading end and onto the surface where we do not want solvent to be applied.

Figure 6:
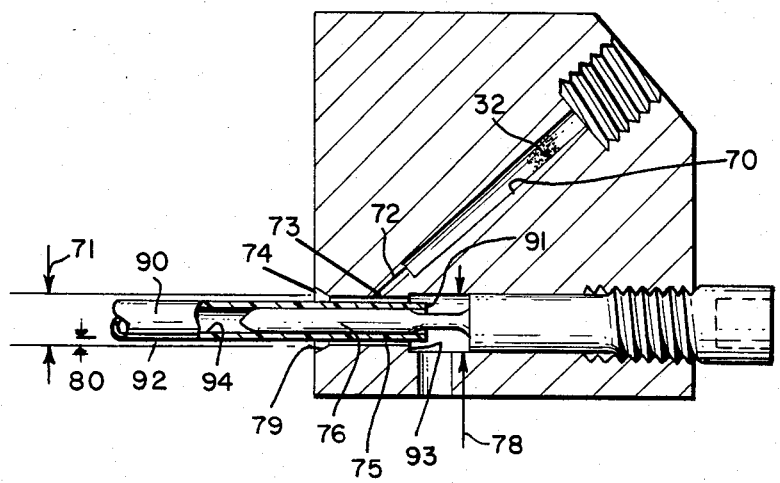
FIG. 6 is a cross-sectional view of an alternative embodiment of a solvent applicator which is used to coat the external surface of an object with solvent.

One alternative embodiment for a solvent applicator which is used to coat the external surface of an object with solvent is disclosed in FIG. 6. As with the embodiment disclosed in FIGS. 2 and 3, solvent 32 is supplied from a reservoir 26 (not shown) through a supply channel 70, to solvent entry passage 72, through hole 73 and into the chamber 74. The object 90 is inserted into the chamber 74. The chamber 74 contains a guiding rod 76 which is inserted into the object 90 as it approaches the chamber 74 to thereby assure that the object 90 will be centered within chamber 74. The difference in this embodiment of the present invention is that the chamber 74 is not of uniform diameter or cross-section throughout its length. At a location interior of solvent entry passage 72 and hole 73 in chamber wall 75, the chamber diameter or cross-section is suddenly increased by a step-wise jump. The diameter 71 of the chamber 74 adjacent its opening 79 is increased to a slightly larger diameter 78. By way of illustration only, if the initial diameter 71 of the chamber 74 is approximately 0.147 inches, then the increased diameter 78 can be approximately 0.188 inches. The object 90 is inserted such that its open or leading end 91 extends slightly beyond that location where the chamber diameter increases to the larger size. By way of example, the leading end 91 can extend for a distance approximately 1/32nd of an inch beyond the location 93 where the chamber diameter increases. As a result the gap 80 between the exterior surface 92 of object 90 and the interior surface 75 of chamber 74 is uniform for most of the distance where the object is inside the chamber 74 and then the gap 80 increases at a location 93 adjacent the open or leading end 91 of the object. Now, when solvent 32 is applied as previously described, capillary action will once again cause the solvent which is emitted from hole 73 to shoot onto the exterior surface 92 of the object 90 and spread along the entire exterior surface 92 at the location around the entry passageway hole 73. However, at the location 93 where the chamber 74 increases in diameter, the increase in the width of gap 80 breaks the capillary action at that point and solvent will not spread to the location of the surface 92 which lies in the area where the gap 80 is increased. As a result, solvent 32 will not reach the leading end 91 and therefore cannot spread around the leading end 91 and onto the interior surface 94 of the object 90.

It should also be noted that in the embodiment disclosed in FIG. 6, the solvent entry passage 72 is set at an angle to the housing chamber 74 instead of being perpendicular to it as shown in the embodiment in FIGS. 2 and 3. This is simply another embodiment, any orientation other than totally horizontal is satisfactory. By way of example, the angle of the entry passage to the chamber can be approximately 40 degrees.

It is possible that the solvent supply channel 70 and entry passage 72 disclosed in FIG. 6 can be replaced by a syringe with a hypodermic needle to inject pulsed small quantities of solvent into chamber 74.

Similarly, a cross-sectional view of an alternative embodiment of a solvent applicator which is used to coat the internal surface of an object with solvent is disclosed in FIG. 7. The solvent applicator 100 contains a housing 102 which has within it a supply reservoir tube 104 from which solvent 32 is brought from a supply reservoir (not shown). Once again, a transverse passage 106 connects the supply reservoir channel or tube 104 with the outer surface 110 of the applicator 100. While the front edge 101 of the housing is shown as generally bullet shape as opposed to flat as shown in FIGS. 4 and 5, this is simply an alternative design and is not significant. What is of significance, however, is that the outer surface 110 of applicator 100 is not of uniform diameter. At a location rearward of said transverse passage, the diameter of the applicator housing 102 deceases. As with the embodiment disclosed in FIG. 6, the decease in the diameter can be approximately 0.041 inches, by way of example. As with the embodiments disclosed in FIGS. 4 and 5, the applicator 100 is inserted into an object 120. The object 120 which is hollow has a leading or open end 122, an interior surface 124 and an exterior surface 126. The applicator 100 is inserted into object 120 such that the area where the diameter of the housing 102 is deceased extends into the object 120 by a slight distance, for example 1/32nd of an inch. As a result, the leading edge 122 of the object 120 is adjacent the reduced diameter portion of the housing 102. Once again, solvent 32 is supplied under pressure from a reservoir (not shown) and goes through supply channel or tube 104 and to transverse entry passage 106. Solvent exits the supply passage 106 through hole 108 in surface 110 and is squirted onto the interior surface 124 of object 120. As before, by capillary action, the solvent 32 spreads along the entire interior surface 124 of object 120 in the area of hole 108. When the solvent reaches the point 127 where the diameter of the housing 102 is deceased and therefore the gap 130 between the housing 102 and the interior surface 124 of the object is increased, the increase in the gap breaks the capillary action and prevents the solvent from spreading to the surface area 124 at the location of the increased gap size. Since solvent 32 does not spread to this location, it does not reach the leading end 122 of object 120 and therefore will not go around the leading or open end 122 and onto exterior surface 126.

The present invention can be used as a joint unit where the same reservoir feeds both the internal and external solvent applicators described above or else the embodiments can be used separately with separate reservoirs for specific applications. The present invention can be used independently as a free standing unit for mass production of solvent bonding objects or else the present invention can be incorporated into and used as part of a mass production assembly machine which processes objects such as tubing and then inserts other objects into or onto the tubing. One example of such a mass production machine is described in our presently co-pending U.S. patent application Ser. No. 449,143 filed Dec. 31, 1982 and entitled: Method And Apparatus For Moving, Handling And Mounting Attachments Onto A Length Of Flexible Material. After the attachments have been mounted onto the material such as tubing as described in our previous application, the jaws can then bring the tubing around to a station which contains the present invention. One or both ends of the tubing can then be solvent bonded to another object. For example, the external surface of one end of the tubing can be solvent bonded to a drip chamber subassembly and the internal surface of the other end of the tubing can be solvent bonded to an injection site subassembly.

While the objects that have been desctibed in this application have been plastic cylindrical tubing, it will be appreciated that any object which is made of a material that permits solvent bonding can be used with the present invention. The cross-section of the chamber 12 or housing 60 is accordingly similar to the cross-section of the object to which solvent will be applied, with the same narrow gap to facilitate capillary action and spreading of the solvent over the entire surface area of the object adjacent the location where the injection hole is located.

Therefore, in summary, the present invention relates to an apparatus for applying a solvent to the external surface of an object comprising, a housing member; a longitudinal internal chamber extending within said housing member and opening at one face of said housing member; the cross-section of said internal chamber being slightly larger than the cross-section of said object to which solvent will be applied; the surface of said internal chamber containing a hole; said housing member further containing a reservoir feed chamber which is connected to a supply reservoir; a passage connecting said reservoir feed chamber to said hole in the surface of said internal chamber; and said supply reservoir containing a solvent. Therefore, when said object is inserted into said internal chamber, said solvent is fed under pressure by feeding means from said supply reservoir to said reservoir feed chamber, then through said passage and out said hole in the surface of said internal chamber and onto the external surface of said object such that capillary action resulting from the close distance between the object and internal chamber wall will cause said solvent to spread along and around the entire circumference of said object in the area adjacent said hole.

The present invention also relates to the method of applying solvent to the external surface of an object comprising, inserting said object into a chamber contained within a housing member such that only a small gap exists between the external surface of the object and the internal surface of said chamber; and feeding solvent under pressure from a supply reservoir to an opening in the surface of said chamber such that solvent is spread onto the external surface of said object; whereby capillary action resulting from the close distance between the object and internal chamber surface will cause said solvent to spread along and around the entire circumference of said object in the area adjacent said opening.

The present invention also relates to an apparatus for applying a solvent to the internal surface of the hollow portion of an object comprising, a housing member; the cross-section of said housing member being slightly smaller than the internal cross-section of the hollow portion of said object to which solvent will be applied; the external surface of said housing member containing a hole; a reservoir feed chamber located within said housing member and connected to a supply reservoir; a passage connecting said reservoir feed chamber to said hole in the surface of said housing member; and a supply reservoir containing a solvent. Therefore, when said housing member is inserted into the hollow portion of said object, said solvent is fed under pressure by feeding means from said supply reservoir to said reservoir feed chamber, then through said passage and out said hole in the surface of said housing member and onto the internal surface of the hollow portion of said object such that capillary action resulting from the close distance between the housing member and the internal surface of the object will cause said solvent to spread along and around the entire internal circumference of said object in the area adjacent said hole.

Finally, the present invention also relates to a method of applying solvent to the internal surface of the hollow portion of an object comprising, inserting a housing member into the hollow portion of said object such that only a small gap exists between the external surface of the housing member and the internal surface of said object; and feeding solvent under pressure from a supply reservoir to an opening in the surface of said housing member such that solvent is spread onto the internal surface of said object; whereby capillary action resulting from the close distance between the surface of the housing member and the internal surface of the object will cause said solvent to spread along and around the entire circumference of the internal surface of said object in the area adjacent and around said opening.

Of course, the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus and methods shown are intended only for illustration and for disclosure of an operative embodiment and method of operation and not to show all of the various forms of modification in which the invention might be embodied or operated.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. An apparatus for applying a solvent to the external surface of an object comprising:
   a. a housing member;
   b. a longitudinal internal chamber extending within said housing member;
   c. the cross-section of said internal chamber being slightly larger than the cross-section of said object to which solvent will be applied;
   d. the surface of said internal chamber containing a hole;
   e. said housing member further containing a reservoir feed chamber which is connected to a supply reservoir;
   f. a passage connecting said reservoir feed chamber to said hole in the surface of said internal chamber; and
   g. said supply reservoir containing a solvent;
   h. whereby when said object is inserted into said internal chamber, said solvent is fed under pressure by feeding means from said supply reservoir to said reservoir feed chamber, then through said passage and out said hole in the surface of said internal chamber and onto the external surface of said object such that capillary action resulting from the close distance between the object and internal chamber wall will cause said solvent to spread along and around the entire circumference of said object in the area adjacent said hole.

2. The invention as defined in claim 1 wherein said internal chamber further contains a longitudinal guiding rod which is located along the length of said internal chamber and at the approximate central cross-sectional portion of said internal chamber, to thereby guide said object into the internal chamber to assure that it will be centrally located within the chamber.

3. The invention as defined in claim 1 wherein said internal chamber surface contains a multiplicity of holes located along the circumference of said internal chamber and at approximately the same longitudinal distance from one end, and each of said multiplicity of holes is connected to the reservoir supply chamber by a passage.

4. The invention as defined in claim 1 wherein said internal chamber contains a multiplicity of holes located at spaced distances along the length of said internal chamber surface, and each of said multiplicity of holes is connected to the reservoir supply chamber by a passage.

5. The invention as defined in claim 1 wherein said object to which solvent will be applied is a cylindrical tube.

6. The invention as defined in claim 1 wherein said solvent is Cyclohexanone.

7. The invention as defined in claim 1 wherein said gap between said internal chamber surface and the external surface of said object is approximately 5/1000ths to 10/1000ths of an inch.

8. The invention as defined in claim 1 wherein solvent is applied to the surface of said object for a duration of approximately 50 milliseconds.

9. The invention as defined in claim 1 wherein said housing member contains an opening which is sealed during operation but which can be opened to facilitate the insertion of a cleaning implement to clean said reservoir supply chamber, said passageway and said hole.

10. An apparatus for applying a solvent to the internal surface of the hollow portion of an object comprising:
    a. a housing member;
    b. the cross-section of said housing member being slightly smaller than the internal cross-section of the hollow portion of said object to which solvent will be applied;
    c. the external surface of said housing member containing a hole;
    d. a reservoir feed chameber located within said housing member and connected to a supply reservoir;

e. a passage connecting said reservoir feed chamber to said hole in the surface of said housing member; and f. a supply reservoir containing a solvent;

g. whereby when said housing member is inserted into the hollow portion of said object, said solvent is fed under pressure by feeding means from said supply reservoir to said reservoir feed chamber, then through said passage and out said hole in the surface of said housing member and onto the internal surface of the hollow portion of said object such that capillary action resulting from the close distance between the housing member and the internal surface of the object will cause said solvent to spread along and around the entire internal circumference of said object in the area adjacent said hole.

11. The invention as defined in claim 10 wherein said housing member surface contains a multiplicity of holes located along the circumference of said housing member and at approximately the same longitudinal distance from one end, and each of said multiplicity of holes is connected to the reservoir supply chamber by a passage.

12. The invention as defined in claim 10 wherein said housing member contains a multiplicity of holes located at spaced distances along the length of said housing member surface, and each of said multiplicity of holes is connected to the reservoir supply chamber by a passage.

13. The invention as defined in claim 10 wherein said object to which solvent will be applied is a hollow cylindrical tube.

14. The invention as defined in claim 10 wherein said solvent is Cyclohexanone.

15. The invention as defined in claim 10 wherein said gap between said housing member surface and the internal surface of said object is approximately 5/1000ths to 10/1000ths of an inch.

16. The invention as defined in claim 10 wherein solvent is applied to the internal surface of said object for a duration of approximately 50 milliseconds.

17. The method of applying solvent to the external surface of an object comprising:

a. inserting said object into a chamber contained within a housing member such that only a small gap exists between the external surface of the object and the internal surface of said chamber; and b. feeding solvent under pressure from a supply reservoir to an opening in the surface of said chamber such that solvent is spread onto the external surface of said object;

c. whereby capillary action resulting from the close distance between the object and internal chamber surface will cause said solvent to spread along and around the entire circumference of said object in the area adjacent said opening.

18. The method of applying solvent to the internal surface of the hollow portion of an object comprising:

a. inserting a housing member into the hollow portion of said object such that only a small gap exists between the external surface of the housing member and the internal surface of said object; and b. feeding solvent under pressure from a supply reservoir to an opening in the surface of said housing member such that solvent is spread onto the internal surface of said object;

c. whereby capillary action resulting from the close distance between the surface of the housing member and the internal surface of the object will cause said solvent to spread along and around the entire circumference of the internal surface of said object in the area adjacent and around said opening.

19. An apparatus for applying a solvent to the external surface of an object comprising:

a. a housing member;

b. a longitudinal internal chamber extending within said housing member;

c. the surface of said internal chamber containing a hole;

d. the cross-section of said internal chamber near said hole being slightly larger than the cross-section of said object to which solvent will be applied;

e. the cross-section of said internal chamber being increased in a stepwise manner at the location interior of said hole;

f. said housing member further containing a reservoir feed chamber which is connected to a supply reservoir;

g. a passage connecting said reservoir feed chamber to said hole in the surface of said internal chamber; and h. said supply reservoir containing a solvent;

i. whereby said object is inserted into said internal chamber such that the leading end of the object extends just beyond the location where the cross-section of the chamber is increased in a stepwise manner to thereby increase the gap between the exterior surface of the object and the interior surface of the chamber, said solvent is fed under pressure by feeding means from said supply reservoir to said reservoir feed chamber, then through said passage and out said hole in the surface of said internal chamber and onto the external surface of said object such that capillary action resulting from the close distance between the object and internal chamber wall will cause said solvent to spread along and around the entire circumference of said object in the area adjacent said hole and the increased gap adjacent the leading end of the object will break the capillary action and prevent solvent from reaching the leading end of the object.

20. The invention as defined in claim 19 wherein said passage connecting said reservoir feed chamber to said hole is set at an angle to said internal chamber.

21. The invention as defined in claim 20 wherein said angle is approximately 40 degrees.

22. The invention as defined in claim 19 wherein said internal chamber further contains a longitudinal guiding rod which is located along the length of said internal chamber and at the approximate central cross-sectional portion of said internal chamber, to thereby guide said object into the internal chamber to assure that it will be centrally located within the chamber.

23. The invention as defined in claim 19 wherein said internal chamber surface contains a multiplicity of holes located along the circumference of said internal chamber and at approximately the same longitudinal distance from one end, and each of said multiplicity of holes is connected to the reservoir supply chamber by a passage.

24. The invention as defined in claim 19 wherein said internal chamber contains a multiplicity of holes located at spaced distances along the length of said internal chamber surface, and each of said multiplicity of holes is connected to the reservoir supply chamber by a passage.

25. The invention as defined in claim 19 wherein said object to which solvent will be applied is a cylindrical tube.

26. The invention as defined in claim 19 wherein said solvent is Cyclohexanone.

27. The invention as defined in claim 19 wherein said gap between said internal chamber surface and the external surface of said object is approximately 5/1000ths to 10/1000ths of an inch.

28. The invention as defined in claim 19 wherein solvent is applied to the surface of said object for a duration of approximately 50 milliseconds.

29. The invention as defined in claim 19 wherein said stepwise increase in the cross-section of said chamber results in an increase of approximately 0.041 inches in the diameter of said chamber.

30. An apparatus for applying a solvent to the internal surface of the hollow portion of an object comprising:
   a. a housing member;
   b. the external surface of said housing member containing a hole;
   c. the cross-section of said housing member near said hole being slightly smaller than the internal cross-section of the hollow portion of said object to which solvent will be applied;
   d. the cross-section of said housing member being deceased in a stepwise manner at a location farther removed from the leading edge of the housing member than said hole;
   e. a reservoir feed chamber located within said housing member and connected to a supply reservoir;
   f. a passage connecting said reservoir feed chamber to said hole in the surface of said housing member; and
   g. a supply reservoir containing a solvent;
   h. whereby when said housing member is inserted into the hollow portion of said object such that the location where the cross-section of the housing member is deceased in a stepwise manner is interior of and adjacent the leading end of the object to thereby increase the gap between the interior surface of the object and the exterior surface of the housing member, said solvent is fed under pressure by feeding means from said supply reservoir to said reservoir feed chamber, then through said passage and out said hole in the surface of said housing member and onto the internal surface of the hollow portion of said object such that capillary action resulting from the close distance between the housing member and the internal surface of the object will cause said solvent to spread along and around the entire internal circumference of said object in the area adjacent said hole and the increased gap adjacent the leading end of the object will break the capillary action and prevent solvent from reaching the leading end of the object.

31. The invention as defined in claim 30 wherein said housing member surface contains a multiplicity of holes located along the circumference of said housing member and at approximately the same longitudinal distance from one end, and each of said multiplicity of holes is connected to the reservoir supply chamber by a passage.

32. The invention as defined in claim 30 wherein said housing member contains a multiplicity of holes located at spaced distances along the length of said housing member surface, and each of said multiplicity of holes is connected to the reservoir supply chamber by a passage.

33. The invention as defined in claim 30 wherein said object to which solvent will be applied is to a hollow cylindrical tube.

34. The invention as defined in claim 30 wherein said solvent is Cyclohexanone.

35. The invention as defined in claim 30 wherein said gap between said housing member surface and the internal surface of said object is approximately 5/1000ths to 10/1000ths of an inch.

36. The invention as defined in claim 30 wherein solvent is applied to the internal surface of said object for a duration of approximately 50 milliseconds.

37. The invention as defined in claim 30 wherein said stepwise decrease in the cross-section of said housing member results in an increase of approximately 0.02 inches in the gap between the housing member and the interior surface of said object.

38. The invention as defined in claim 19 wherein said reservoir feed chamber is a syringe and said passage connecting the syringe to said hole in the surface of said internal chamber is a hypodermic needle.

39. The invention as defined in claim 19 wherein the object is inserted into the internal chamber to a distance of approximately 1/32nd of an inch beyond the location where the cross-section of the chamber is increased in a stepwise manner.

40. The invention as defined in claim 30 wherein the distance from the leading end of said object and the location where the cross-section of the housing member is decreased in a stepwise manner is approximately 1/32nd of an inch.

* * * * *